United States Patent
Kaminsky et al.

(10) Patent No.: US 7,292,389 B2
(45) Date of Patent: Nov. 6, 2007

(54) CIRCULAR EXTINCTION CONTRAST IMAGING MICROSCOPE

(75) Inventors: Werner Kaminsky, Seattle, WA (US); Bart Kahr, Seattle, WA (US)

(73) Assignee: University of Washington, Seattle, WA (US)

( * ) Notice: Subject to any disclaimer, the term of this patent is extended or adjusted under 35 U.S.C. 154(b) by 198 days.

(21) Appl. No.: 10/968,834

(22) Filed: Oct. 18, 2004

(65) Prior Publication Data

US 2005/0134687 A1    Jun. 23, 2005

Related U.S. Application Data

(60) Provisional application No. 60/512,628, filed on Oct. 17, 2003.

(51) Int. Cl.
*G02B 21/00* (2006.01)
*G02B 21/06* (2006.01)
*G01J 4/00* (2006.01)

(52) U.S. Cl. .................. 359/371; 359/386; 356/365

(58) Field of Classification Search ............. 359/371, 359/386, 368; 356/364–369
See application file for complete search history.

(56) References Cited

U.S. PATENT DOCUMENTS 5,521,705 A * 5/1996 Oldenbourg et al. ........ 356/368
5,975,702 A * 11/1999 Pugh et al. .................. 351/246
6,924,893 B2 * 8/2005 Oldenbourg et al. ........ 356/369

OTHER PUBLICATIONS

Reiko Kuroda, "A solid-state dedicated circular dichroism spectrophotometer; Development and application", Review of Scientific Instruments, 2001, vol. 72, No. 10, pp. 3802-3810.
Colin Nuckolls et al., "Circular Dichorism and UV-Visible Absorption Spectra of the Langmulr-Blodgett Films of an Aggregating Helicene", J. Am. Chem. Soc., 1998, vol. 120, pp. 8656-8660.

* cited by examiner

*Primary Examiner*—Alessandro Amari
(74) *Attorney, Agent, or Firm*—Townsend and Townsend and Crew LLP; Gerald T. Gray

(57) ABSTRACT

Systems and methods for producing circular extinction (CE) contrast images of anisotropic samples. Microscope systems for determining circular extinction (CE), the differential transmission of left and right circularly polarized light resulting from circular dichroism (CD) of an anisotropic sample, include mechanically driven optical components and an image detector such as a monochromatic CCD camera to detect light intensities. In one aspect, optical components include a tunable filter, a rotatable linear polarizer and a variable retarder. The tunable filter is adjustable to provide light at a specific desired wavelength. The linear polarizer is adjustable to provide linearly polarized light with a specific wave vector, and the variable retarder is adjustable to produce near perfect circular polarized light at every selected wavelength. For example, in one aspect, the variable retarder includes a linear birefringent plate tiltable around one of its eigenmodes perpendicular to the wave vector of polarized light. The plate may be controllably tilted so that it functions as a perfect $\lambda/4$ plate at each wavelength.

34 Claims, 12 Drawing Sheets

Visible light circular extinction imaging microscope (CEIM). Schematic omits motors and mounts. (1) light source (2) variable interference filter (3) depolarizer (4) rotating polarizer (5) tilting $\lambda/4$-compensator (6) sample mount (7) objective (8) projector lens (9) depolarizer (10) CCD-camera.

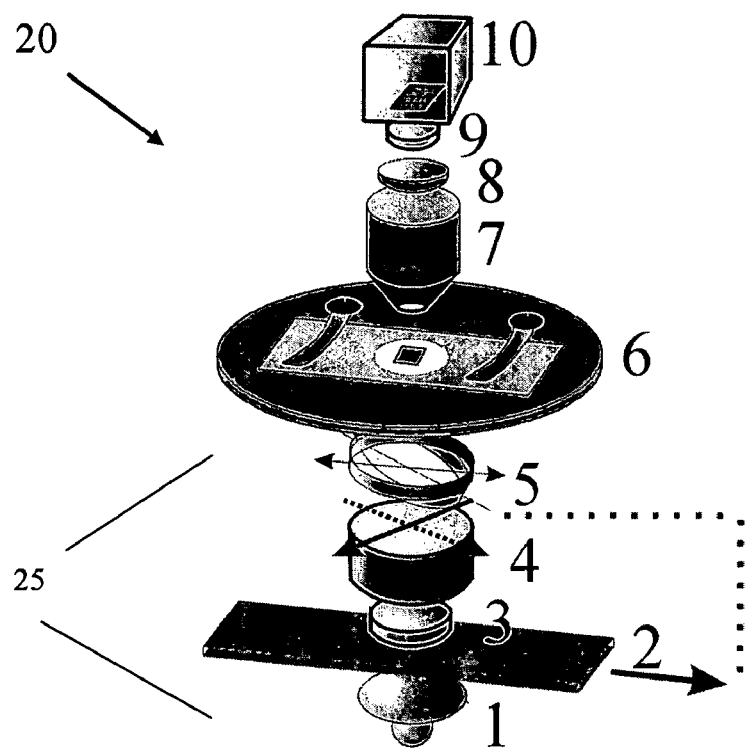
FIGURE 1. Visible light circular extinction imaging microscope (CEIM). Schematic omits motors and mounts. (1) light source (2) variable interference filter (3) depolarizer (4) rotating polarizer (5) tilting λ/4-compensator (6) sample mount (7) objective (8) projector lens (9) depolarizer (10) CCD-camera.

FIGURE 3 Flowchart showing the determination of a CD-image for a set wavelength using a reference square inside the CCD-image for correcting light fluctuations. Maxframes is the selected maximum numbers of image frames captured between polarizer turns.
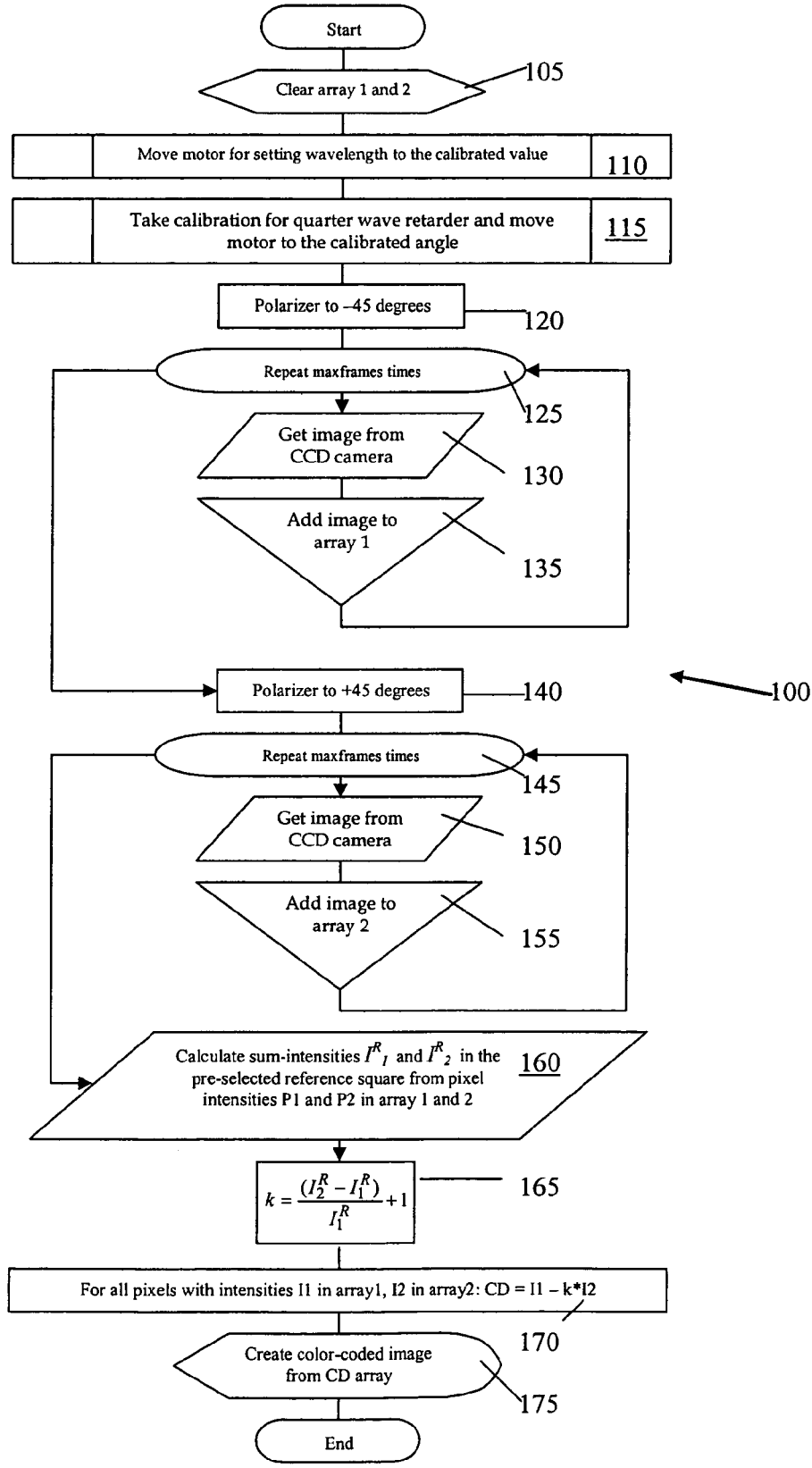

Figure 4. CD-image and spectrum, including absorption of 1,8-dihydroxyanthraquinone (DHA).

4a - Top: CD micrograph at 530 nm of thin DHA crystal < 50 □m thick showing clearly the (110) and (100) twin planes between enantiomorphous domains Regions *a* and *b* are thin, overlaid crystallites. Region *c* shows an intergrown crystallite with a superposition of enantiomorphous domains ((001) twinning) that may reveal a nascent pinwheel of the kind observed in thicker samples. The linear features are due to scratches and needles of a metastable polymorph.

4b - Bottom: Electronic absorption (black) and circular dichroism spectra (red and blue) of DHA crystal corresponding to the red and blue regions in top left of figure, respectively. CD is expressed at the ratio $(I_R-I_L)/I_0$.

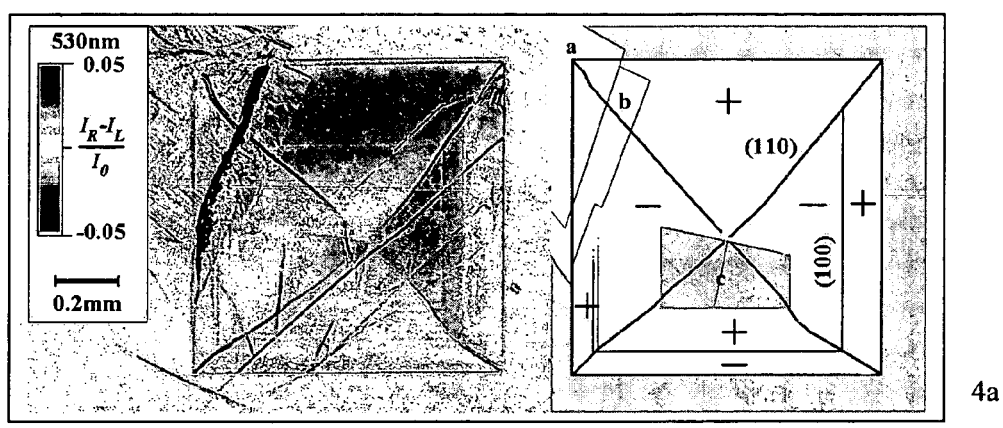

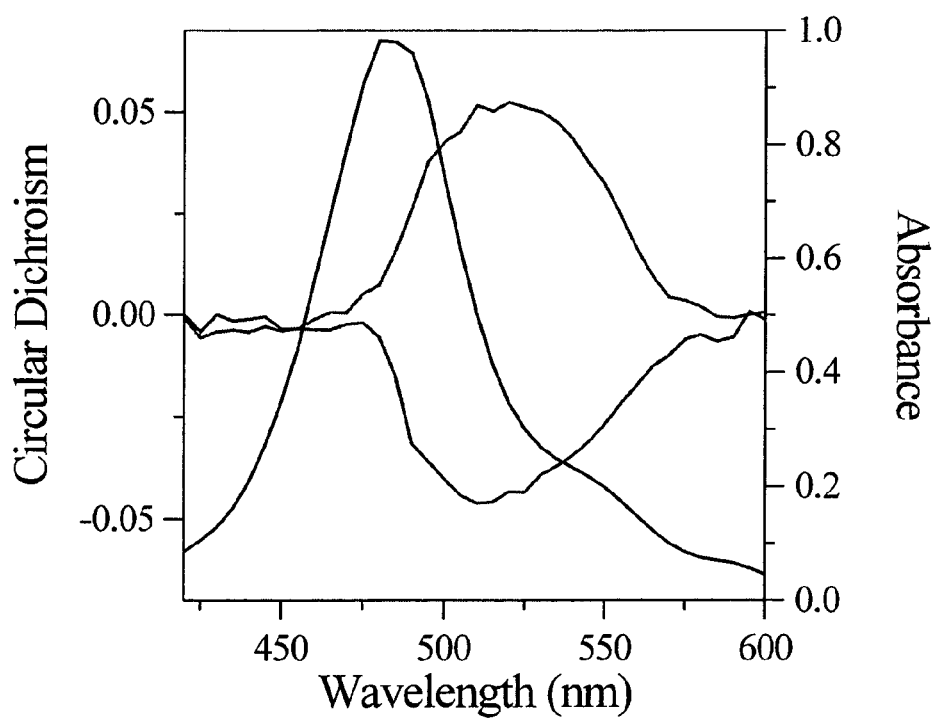

Figure 5. CD images, CD- and absorbance spectra of horse-oxy-hemoglobin crystals
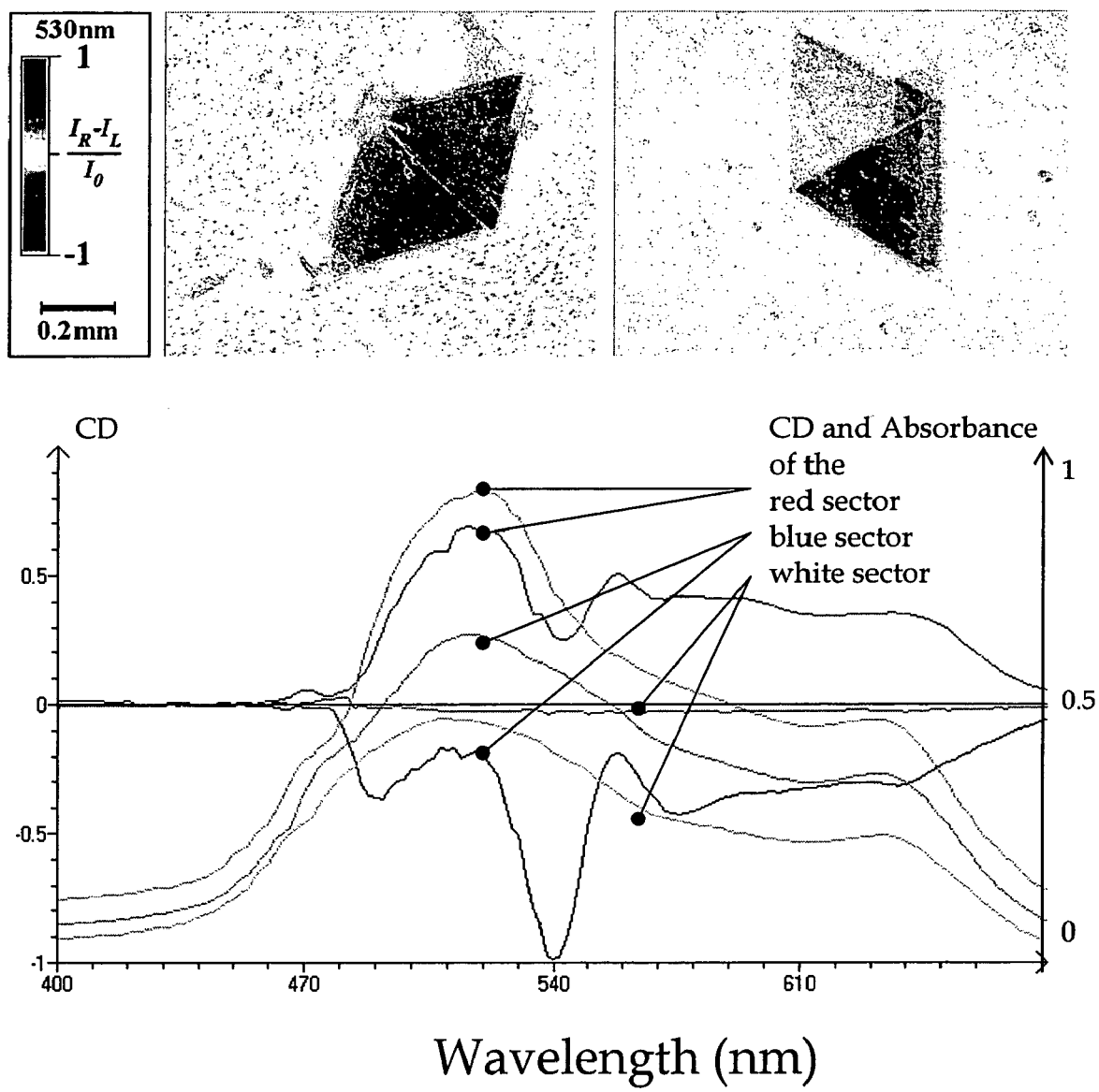

Figure 6. CD-image, absorption image, CD and absorbance spectra of Congo-red dyed amyloid Fibrils. The image was invariant under 90 degrees rotation and flipping the sample. The CD spectrum was taken from the strongly blue false-colored section, size 5 x 5 µm.
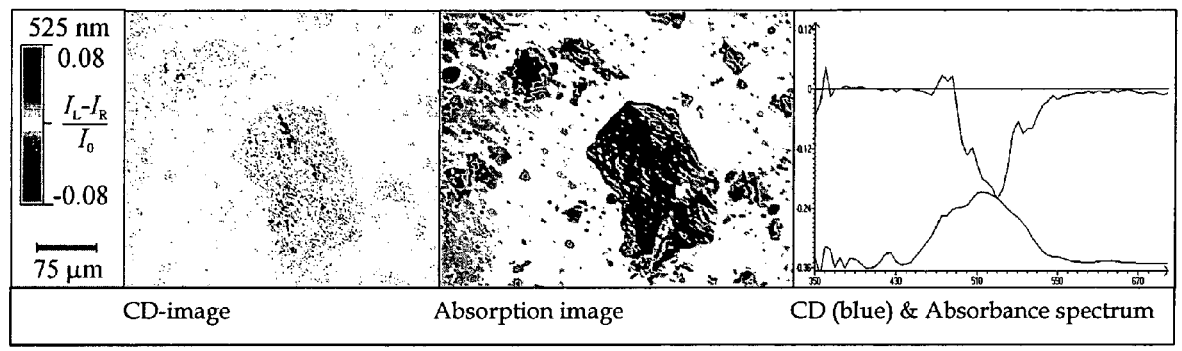

Figure 7. Optical rotatory scattering image of LiKSO$_4$. After a flip, the CE insider each of the four sectors with strong CE effect changes sign. Red dotted lines in the absorption image indicate twin boundaries (mirror planes).
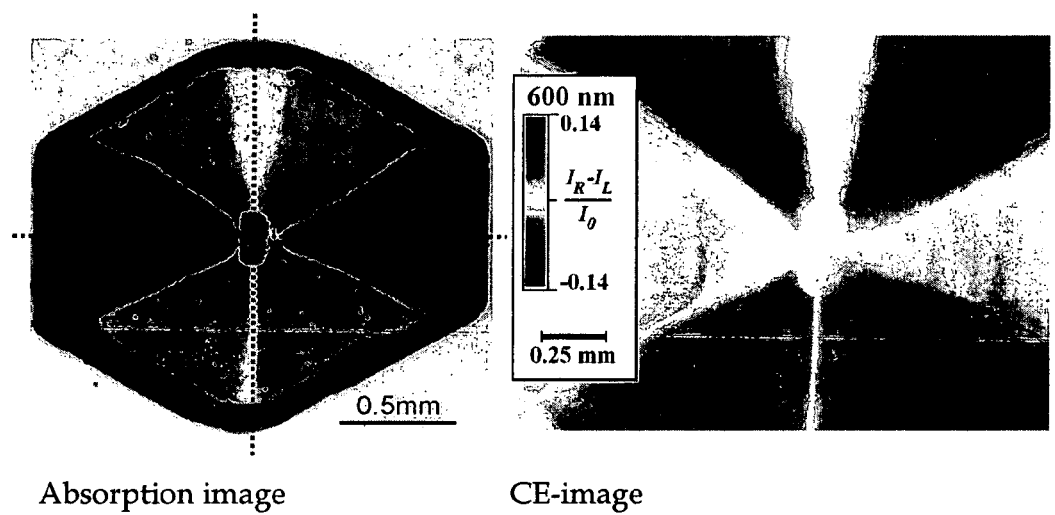
Absorption image            CE-image

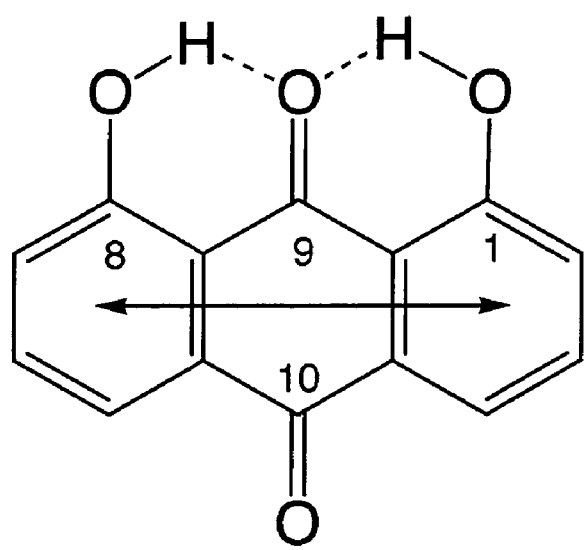
FIGURE 8. 1,8-Dihydroxyanthraquinone (DHA) with the electric dipole transition moment indicated for the lowest energy π→π* transition.

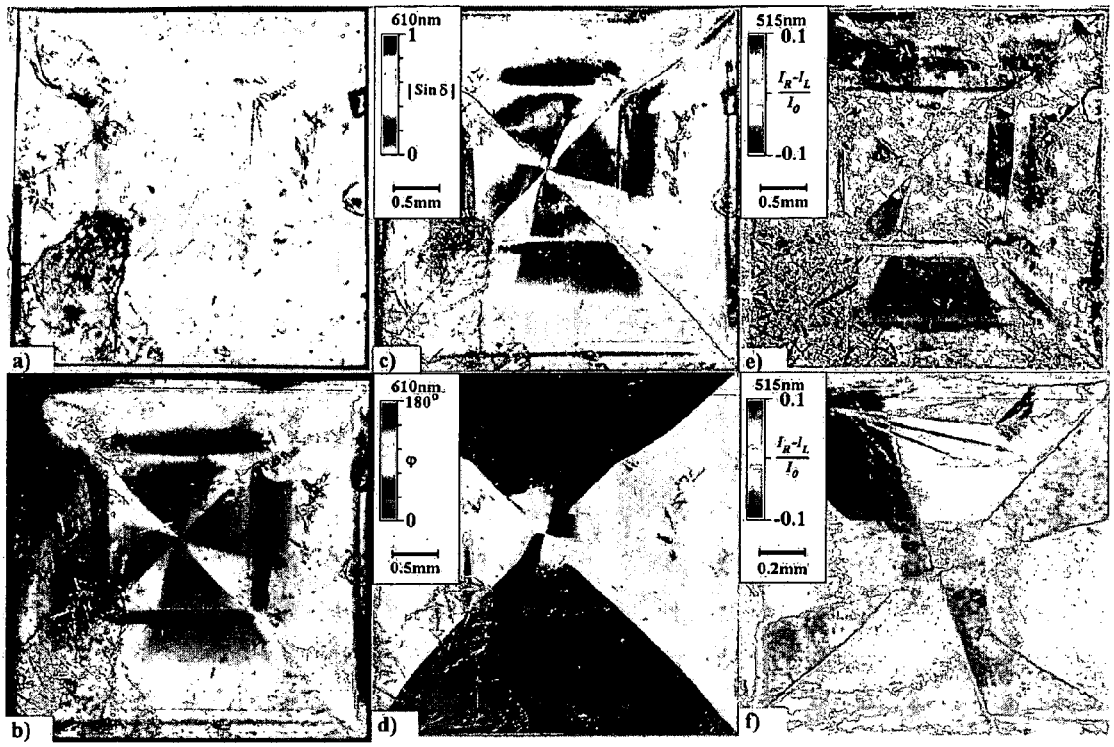

FIGURE 9. (a) DHA crystal (2.5 mm × 2.5 mm × 100 μm) in white light viewed along [001]. The absorbance is larger in the raised center. (b) Crystal in (a) between crossed polarizers. When viewed along [001], the presumed optic axis, the crystal is not wholly extinct. (c) Linear birefringence image recorded as the sine of the retardance, $\delta = 2\pi \Delta n L / \lambda$, at 610 nm. (d) Orientation of the optical indicatrix recorded as the extinction angle from the horizontal axis. (e) Circular dichroism image of crystal in a-d recorded as $(I_{45}-I_{-45})/I_o$. (f) Central region of another crystal with heterochiral pinwheel.

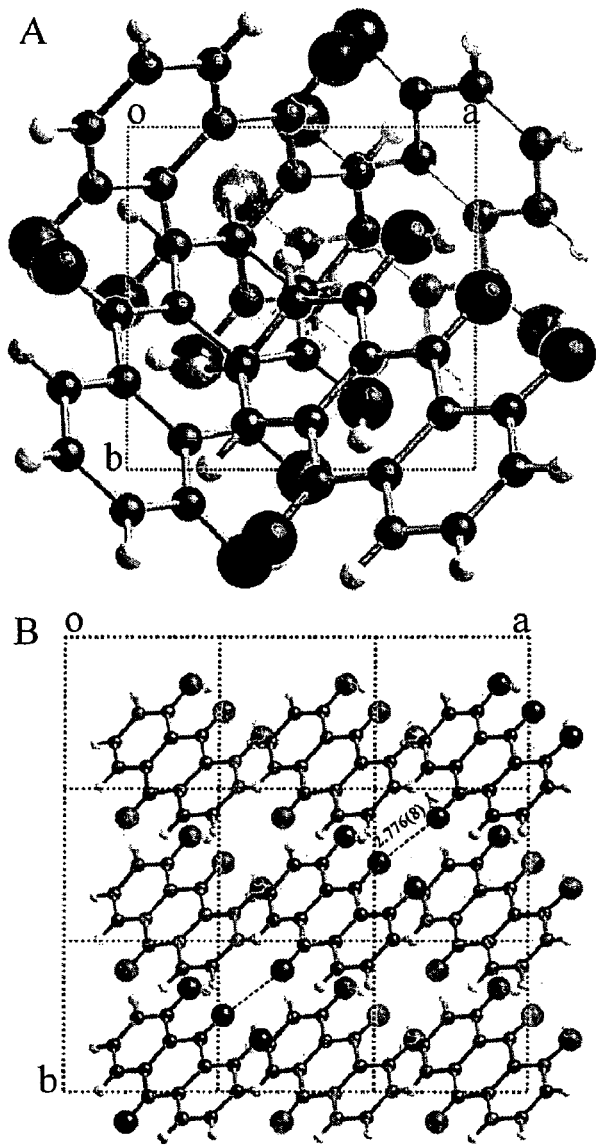
FIGURE 10. (A) Unit cell of the $P4_1$ crystal viewed along the fourfold axis [001]. (B) Single layer of DHA. In (A) the shading indicates depth. In (B) all of the molecules are at the same height. Here, the highlighting serves merely to emphasize one dipole-coupled chain.

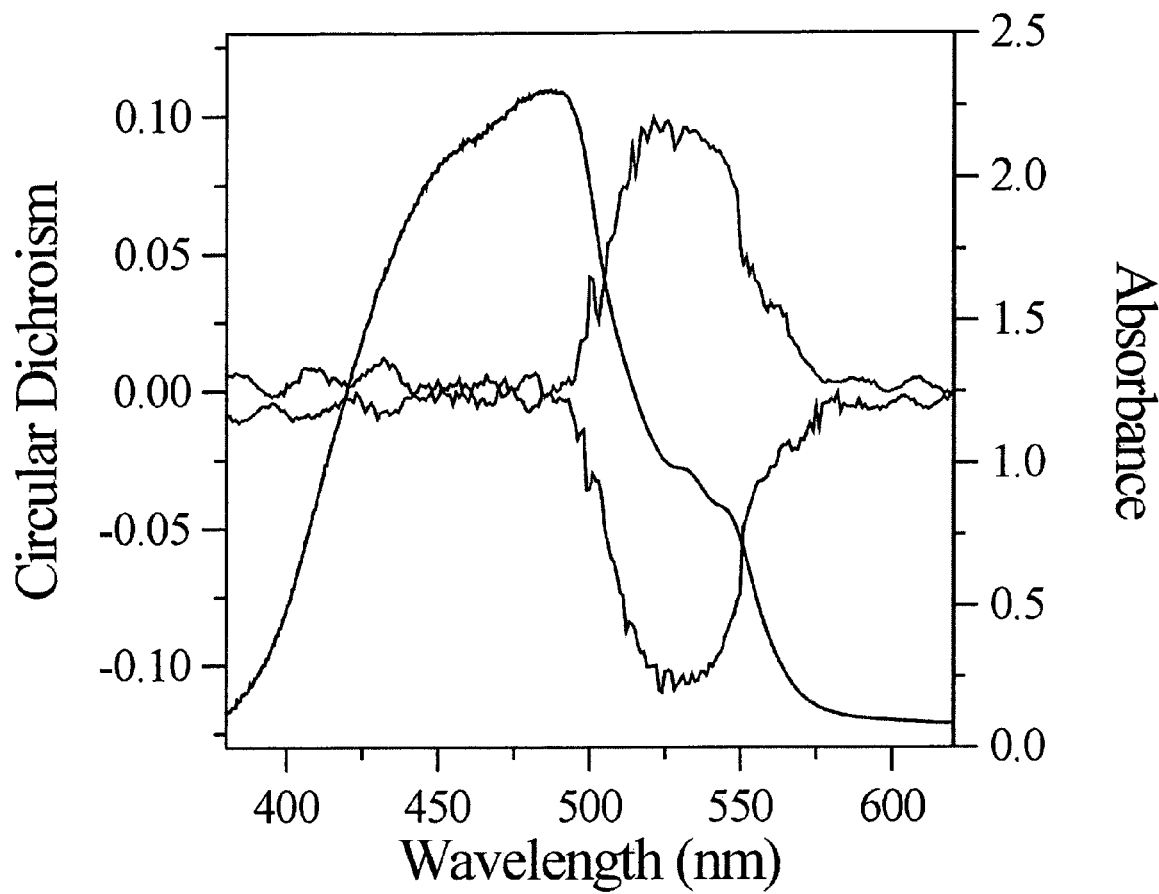
FIGURE 11. Electronic absorption (black) and circular dichroism spectra (red and blue) of DHA crystal corresponding to the red and blue regions in Figure 9e, respectively. CD is expressed at the ratio $(I_{45}-I_{-45})/I_0$.

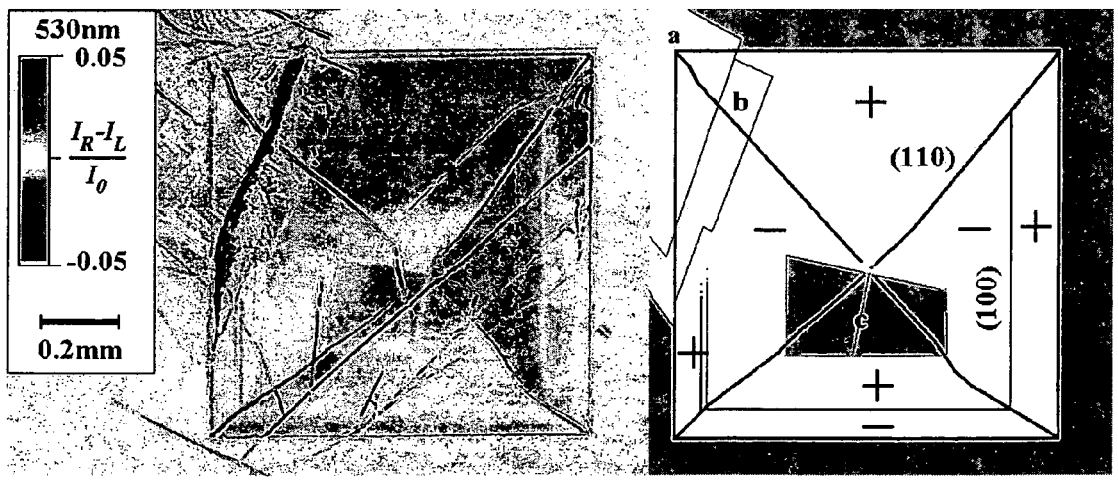

FIGURE 12. CD micrograph at 530 nm of thin DHA crystal < 50 μm thick showing clearly the (110) and (100) twin planes between enantiomorphous domains Regions *a* and *b* are thin, overlaid crystallites. Region *c* shows an inter-grown crystallite with a superposition of enantiomorphous domains ((001) twinning) that may reveal a nascent pinwheel of the kind observed in thicker samples (Figure 9e and f). The linear features are due to scratches and needles of a metastable polymorph.

CIRCULAR EXTINCTION CONTRAST IMAGING MICROSCOPE

CROSS-REFERENCES TO RELATED APPLICATIONS

This application is a non-provisional application of U.S. Provisional Application Ser. No. 60/512,628, filed Oct. 17, 2003, the contents of which are hereby incorporated by reference.

STATEMENT AS TO RIGHTS TO INVENTIONS MADE UNDER FEDERALLY SPONSORED RESEARCH OR DEVELOPMENT

The government may have certain rights to the invention based on NSF Grant No. CHE-0092617, "Optical Probes of Crystal Growth Mechanisms", and NSF Grant No. CHE-0092817.

BACKGROUND OF THE INVENTION

The present invention relates generally to optical microscopy systems and methods, and more particularly to systems and methods for producing circular extinction (CE) contrast images, including circular dichroism (CD) images.

Circular dichroism (CD) is the differential absorption (circular extinction, CE) of left- and right-circularly polarized light (CPL) traversing a sample. CD reveals the dissymmetry of a molecule's chromophores which then also exhibit circular birefringence (CB), manifested in optical rotation (OR), i.e., the change in the azimuth of light passing through chiral substances that results from different refractive indices for left and right CPL.

The idea of a CD microscope for anisotropic samples is not new. In 1982, Maestre and Katz adapted a Carey spectropolarimeter to a microscope for single point measurements of the CD spectra of chromatin. (See, Maestre, M. F.; Katz, J. E. *Biopolymers*, 1982, 21, 1899–1908. See also: Maestre, M. F.; Salzman, G. C.; Tobey, R. A.; Bustamante, C. *Biochemistry*, 1985, 24, 5152–5157; Livolant, F.; Mickols, W.; Maestre, M. F. *Biopolymers*, 1988, 27, 1761–1769; Livolant, F.; Maestre, M. F. *Biochemistry*, 1988, 27, 3056–3068). They faced instrumental artifacts (see, Shindo, Y.; Nishio, M.; Maeda, S. *Biopolymers*, 1990, 30, 405–413; Sindo, Y.; Ohmi, Y. *J. Am. Chem. Soc.* 1985,107, 91–97) arising from electronic polarization modulators in commercial instruments that typically generate sinusoidally varying polarization states, (see, Hipps, K. W.; Crosby, G. A. *J. Phys. Chem.* 1979, 83, 555–562) thereby introducing a small admixture of linearly polarized light into the circularly polarized output. Residual ellipticity, when coupled with the LB and LD of ordered media, generates artifactual CD signals. (See, Schellman, J.; Jensen, H. P. *Chem. Rev,* 1987, 87, 1359–1399 and Disch, R. L; Sverdlik, D. I. *Anal. Chem.* 1969, 41, 82–86). Strain in photoelastic modulators (PEMs) compounds these artifacts. (See, Nordén, B. *Acta Chem. Scand.* 1972, 26, 1763–1776; Davidsson, Å, Nordén, B. *Spectrochim. Acta, Pt. A,* 1976, 32, 717–722; Davidsson, Å; Nordén, B.; Seth, S. *Chem. Phys. Lett.* 1980, 70, 313–316) Attempts have been made to skirt these problems by adding additional modulators, (see, Cheng, J. T.; Nafie, L. A.; Stephens, P. J. *J. Opt. Soc. Am.,* 1987, 65, 1031–1035) rotating the sample, (see, Tunis-Schneider, M. J. B.; Maestre, M. F., *J. Mol. Biol.* 1970, 52, 521–541; Nuckolls, C.; Katz, T. J.; Verbiest, T.; Van Elshocht, S.; Kuball, H. G.; Kiesewalter, S.; Lovinger, A. J.; Persoons, A. J. *J. Am. Chem. Soc.* 1998, 120, 8656–8660) and performing complex analytical transformations of independent chiroptical measurements. (See, Kuball, H.-G.; Altschuh, J. *Chem. Phys. Lett.* 1982, 87, 599–603) Most recently, Kuroda, in collaboration with JASCO, made advances by tailoring a single point CD spectropolarimeter for solid-state samples by selecting a photomultiplier tube with the smallest polarization bias and a PEM with the least residual static birefringence. (See, Kuroda, R.; Harada, T.; Shindo, Y. *Rev. Sci. Instr.* 2001, 72, 3802–3810).

Despite its widespread use in structure determination, CD and OR spectroscopy is woefully under-utilized, especially in the analysis of organized media that exhibit linear anisotropies.

The phenomenon of refractive index anisotropy and absorption anisotropy is called linear birefringence (LB) and linear dichroism (LD). In isotropic media, (LD) and (LB) disappear enabling the measurement of CD. In practice, this was not routine until the 1960s, when electro-optic circular polarization modulators were incorporated in commercial instruments. With electro-optic modulation, $\lambda/4$ retardation may be achieved in a crystalline material through an applied electric field. Photoelastic modulators (PEMs), strain sensitive materials oscillated via the electrostrictive effect, are the current standard.

In anisotropic media, LB and LD obscure OR and CD; the latter are often three or four orders of magnitude smaller. When a sample is sufficiently thin, two orthogonal, linearly-polarized eigenrays emerge as a coherent superposition, now containing the phase difference $\delta$, where $=2\pi\Delta nL/\lambda$, where L is the thickness and $\Delta n$ is the difference in the refractive indices (or liner birefringence (LB)). A sample that absorbs one of the orthogonal polarized light beams in preference to the other displays absorption anisotropy, called linear dichroism (LD). Measurements of LB or LD probe macroscopic structure in terms of the alignment and orientation of its components as sampled by the eigenrays.

Measuring OR or CD in organized media may be likened to searching for a needle in a haystack. Ever since OR was discovered in 1811 by Arago, measurements of chiroptical effects have been nearly impossible for anisotropic samples. It is therefore not surprising that the most recent measurements on oriented or solid samples have focused on uniaxial, nematic liquid crystals, films, and powders.

The difficulty of measuring CD of organized media with commercial instruments is so extreme that it is practically assumed from the start that CD measurement is a technique restricted to isotropic solutions. In practice, scientists typically consign CD measurement to unoriented samples and LD measurement to oriented samples, as if the complementary techniques were mutually exclusive.

Part of the problem stems from the fact that electronic modulators typically generate sinusoidally varying polarization states instead of rectangular waveforms, introducing a small admixture of linearly polarized light into their circularly polarized output and thereby preventing the straightforward separation of LB and LD in an anisotropic sample. This will appear as a CD signal in a commercial spectrometer even if the sample's true CD=0. Strain of a photoelastic modulator (PEM) tends to compound these artifacts. Attempts to overcome deficiencies of the above modulation techniques by adding additional modulators, rotating the sample and performing complex analytical transformations of independent chiroptical measurements have been stymied by defects in both the optical train and the phase modulation.

Because CD comes from a small difference in absorbance (as small as 1 part in $10^4$), a reasonable resolution could be achieved in the world before CCD cameras, but only with fast sampling times in electronic modulators (10–100 KHz) and photomultiplier tubes. Why then not use electronic polarization modulation with CCD detection to make images? CCDs operate at about 1 KHz. Being much slower than PEMs they are incompatible with them. While others are trying to force compatibility by speeding up the CCD or slowing down the modulation, these designs remain constrained by limited spectral ranges (<80 nm), noise resulting from the simultaneous operation of two detectors, and sizable deviations from perfect circular polarization (e.g., parasitic ellipticities).

Accordingly, it is desirable to provide a CE contrast imaging system in combination with a CCD detector or other imaging device to provide useful CE contrast images, including CD images. Further, such an imaging system should avoid the use of electric polarization modulation so as to avoid imperfections in circular polarization and thereby improve the quality of CD images.

BRIEF SUMMARY OF THE INVENTION

The present invention provides systems and methods for producing circular extinction (CE) contrast images of anisotropic samples.

In one aspect, the present invention provides a microscope and methods using the microscope for determining circular extinction (CE), the differential transmission of left and right circularly polarized light, which can result from circular dichroism (CD) of an anisotropic sample. The microscope includes mechanically driven optical components and an image detector such as a monochromatic CCD camera to detect light intensities. In one aspect, optical components include a tunable filter, a rotatable linear polarizer and a variable retarder. The tunable filter is adjustable to provide light at a specific desired wavelength. The linear polarizer is adjustable to provide linearly polarized light with a specific wave vector, and the variable retarder is adjustable to produce near perfect circular polarized light at every selected wavelength. For example, in one aspect, the variable retarder includes a linear birefringent plate tiltable around one of its eigenmodes perpendicular to the wave vector of polarized light. The plate may be controllably tilted so that it functions as a perfect $\lambda/4$ plate at each wavelength. In another aspect, the variable retarder includes a Babinet Soleil compensator, or other retardation element(s) that is adjustable to function as a perfect $\lambda/4$ plate at each wavelength. With appropriate selection of components, a microscope of the present invention may operate from in the UV range (e.g., less than about 350 nm), in the visible range (e.g., about 350 nm to about 700 run) and in the IR range (e.g., greater than about 700 nm).

The imaging systems and methods of the present invention provide images that can be separated into true circular extinction that can be scaled by linear dichroism and linear birefringence by means of a single equation. Moreover, in the methods of the present invention, it is not required that a sample under investigation be rotated or aligned. Signal to noise ratio is improved by signal averaging, and in relating the measured intensities to an area within the image that is expected to have no circular extinction effects. This allows for the straightforward elucidation of the true CD spectrum for a sample that displays complex macroscopic anisotropies such as may be found in biologic tissues, twinned crystals, liquid crystals, and fibers of all sorts. For example, a circular extinction imaging microscope (CEIM) according to the present invention can be used to reveal heterochiral domains in biaxial dye crystals. Such heterogeneity is typically masked by linear birefringence (LB) and linear dichroism (LD) and is invisible by conventional X-ray scattering. Contrast in optical microscopy based upon CE has many applications in crystallography as well as in cell biology where organized, optically active structures are ubiquitous.

According to one aspect of the present invention, a system for producing a circular extinction (CE) contrast image of a sample is provided. The system typically includes an optical system configured to selectively produce right and left circularly polarized illumination light at each of one or more specific, selectable wavelengths, and an imaging system, including a CCD detector for detecting an image of a sample positioned in the path of the illumination light between the CCD detector and the optical system. In operation, a first image of the sample is captured by the CCD detector when the illumination light is right circularly polarized at a selected wavelength, and a second image of the sample is captured by the CCD detector when the illumination light is left circularly polarized at the selected wavelength. A CE contrast image of the sample is produced in the imaging system by taking the difference of the first and second images. Multiple CE contrast images may be taken at multiple wavelengths.

According to another aspect of the present invention, a method is provided for producing a circular extinction (CE) contrast image of a sample. The method typically includes illuminating a sample with right circularly polarized light having a substantially monochromatic wavelength, and capturing, using a CCD detector, a first image of the sample illuminated with the right circularly polarized light. The method also typically includes illuminating the sample with left circularly polarized light having the substantially monochromatic wavelength, and capturing, using the CCD detector, a second image of the sample illuminated by the left circularly polarized light. The method further typically includes generating a CE contrast image of the sample using the first and second images.

According to yet another aspect of the present invention, a circular extinction contrast imaging microscope (CEIM) is provided. The CEIM typically includes a monochromatic light source configured to provide substantially monochromatic illumination light at each of one or more selectable wavelengths, a depolarizer for depolarizing the illumination light, a polarization element for linearly polarizing the depolarized illumination light along a direction determined by an angle of rotation of the polarizer, and a variable retardation element configured to convert the polarized illumination light to near perfect circularly polarized light at each of the one or more selectable wavelengths, the handedness of circular polarization being determined by the direction of linear polarization relative to an orientation of the retardation element. The CEIM also typically includes a sample stage for holding a sample, the sample stage being illuminated by the circularly polarized illumination light, an imaging system, including a CCD detector for detecting an image of a sample in the sample holding stage, and a control system, including stepper motors coupled to each of the linear polarizer and the variable retardation element, for automatically controlling the direction of the linear polarization and the orientation of the retardation element so as to control the handedness of the circular polarized illumination light. In operation, a first image of the sample is captured by the CCD detector when the illumination light is right circularly polarized at a selected wavelength, and a second image of the sample is captured by the CCD detector when the illumination light is left circularly polarized at the selected wavelength. A CE contrast image of the sample is produced in the imaging system by taking the difference of the first and second images.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 1 shows a schematic view of a CE microscope according to the present invention.

FIG. 3 illustrates a flowchart for determining a CE-image according to the present invention.

FIG. 4 shows a CD-image and spectrum, including absorption of Dihydroxyanthraquinone FIG. 5 shows CE images, CE-spectrum and Absorbance of oxidized horse-hemoglobin crystals FIG. 6 shows a CD-image, absorption image, CD-spectrum and Absorbance of Congo-red dyed amyloid Fibrils.

FIG. 7 shows an optical rotation scattering image of LiKSO$_4$.

FIG. 8 shows the structure of 1,8-Dihydroxyanthraquinone (DHA).

FIG. 9 shows various microscopy images of a DHA crystal, including a CD image (e).

FIG. 10 illustrates structural images of a DHA crystal.

FIG. 11 shows the absorption and CD spectra of a DHA crystal.

FIG. 12 illustrates a CD micrograph image of a thin DHA crystal.

DETAILED DESCRIPTION OF THE INVENTION

Figures 2A, 2B:
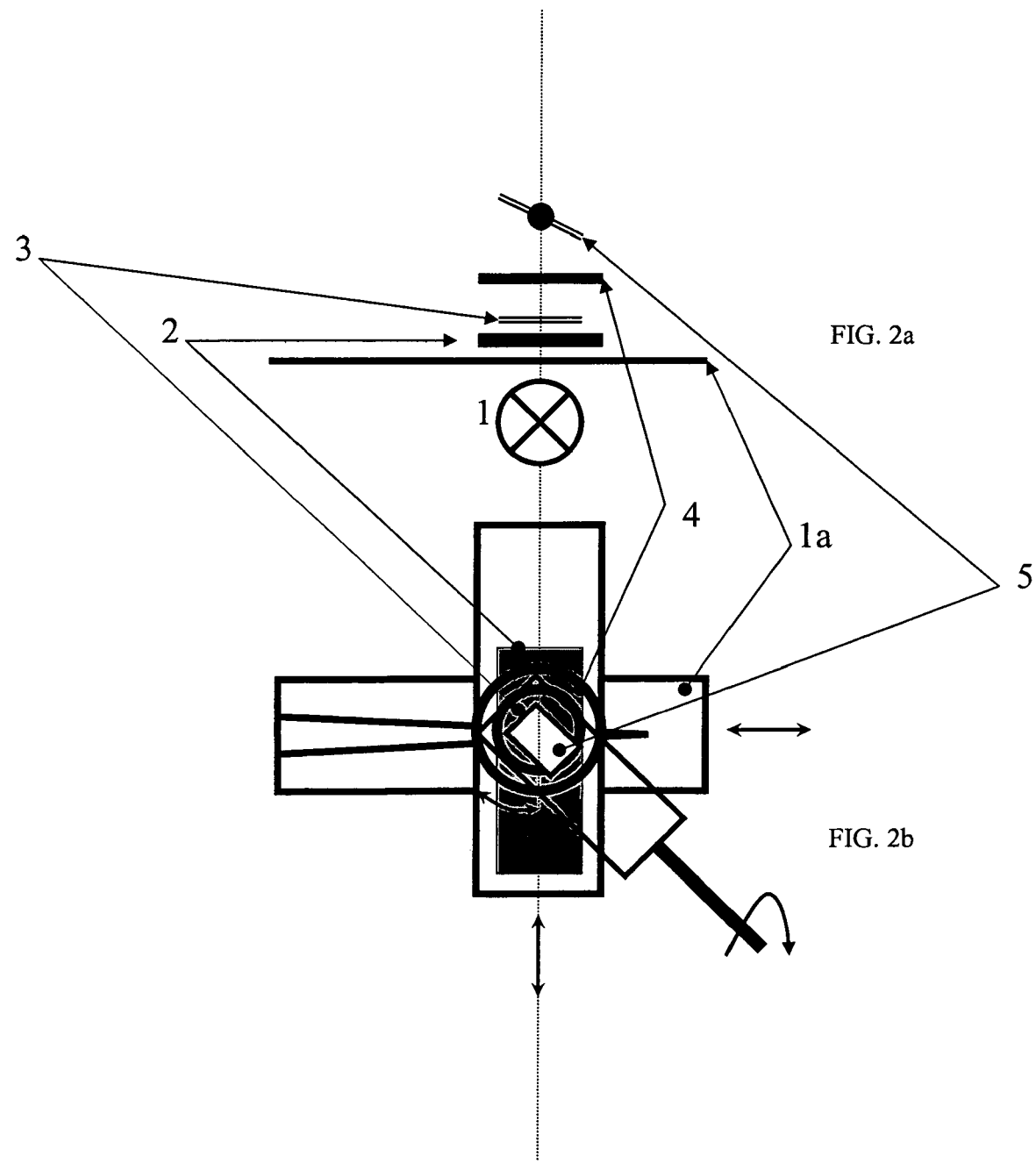
FIG. 2 shows a top (a) and side (b) view of a light modulator system according to the present invention.

The present invention, in certain aspects, provides circular extinction contrast imaging techniques and microscopes based on the mechanical modulation of near perfect circularly polarized light (CPL) in conjunction with CCD detection. Signal to noise lost in slow modulation (e.g., less than about 30 Hz) can be regained by signal averaging techniques using CCD camera images. The systems and techniques of the present invention are particularly useful for studying chiro-optical effects—spontaneous perturbations of the state of electromagnetic radiation exerted by chiral molecules. Molecular chirality, as evidenced by changes in the polarization state of light passing through a given sample, is a shared characteristic of all biopolymers. Tissue sections or fixed cell samples, for example, routinely used in cell biological research and pathological procedures, are replete with optically active biopolymers.

A circular extinction imaging microscope (CEIM) according to one embodiment is illustrated in FIGS. 1 and 2. FIG. 1 shows a microscope system 20 and FIG. 2 shows a light modulation system 25 used in microscope system 20 according to one embodiment. As shown, light modulation system 25 includes a light source 1, a color filter 2, a depolarizer 3, a rotatable linear polarizer 4 and a variable compensator element 5. Light source 1, in one aspect, includes a light bulb that emits white light. The light passes through a color filter 2, which is provided to allow for selection of a specific monochromatic wavelength. For example, in one aspect, filter 2 includes a linear variable spectral filter. A specific wavelength may be selected by translating a linear variable spectral filter along a direction perpendicular to the path of light as shown. An example of a useful variable spectral filter is the Reynard Corporation, Cat # R04610-00, filter that provides 380nm–700nm. For embodiments including a variable spectral filter, it is preferred that light from the light source 1 passes through a variable slit 1a (diaphragm with an elongated V cut out inside) as shown in FIG. 1. At one end of the V, the slit size is small, whereas at the other, the width is large (FIG. 1). Translating the slit allows for control of the line width of monochromatic light passing from the linear variable spectral filter. For example, positioning the small end of the slit in the light path provides a finer line width, and translating to a larger portion of the slit provides for a wider line width. In general, it is preferred that the substantially monochromatic light have a line width of between about 5 nm and about 50 nm, or smaller. It will be appreciated that other elements that produce substantially monochromatic light may be used as would be apparent to one skilled in the art, such as single wavelength filters, diffraction gratings, prisms, etc. Additionally, other light sources may also be used, including monochromatic light sources. Such alternative light sources include arc lamps, LEDs, lasers and others as would be apparent to one skilled in the art. It will be appreciated that the variable slit 1a need not be used where the light source is substantially monochromatic or where single density filters are used.

After passing through filter 2, the monochromatic light is then depolarized with a depolarizer element 3. Depolarizer element operates to transform the light into a continuum of polarization states so as to at least mimic unpolarized radiation. One useful depolarizer is the Optics For Research, Cat. #100ODPU-25, depolarizer. The resulting depolarized light then passes through a rotatable, linear polarizer 4 which produces linearly polarized light with the plane of polarization determined by the rotation angle of the polarization element. One useful linear polarizer is the Ealing, Cat #23-2520, polarizer. This construction is followed by a compensator element 5 designed to operate as a λ/4 wave plate at the selected wavelength(s). Interaction of linearly polarized light with a λ/4 plate transforms the polarization state from linear to circular when the angle between the plane of linear polarization and the extinction direction (e.g., the optic axis of a crystalline retardation plate)of the λ/4 plate is 45°. When less than 45°, the linear polarization state is converted to an elliptical polarization state. The handedness of the circular polarization state is reversed when this angle is −45°. In one aspect, to allow for operation at multiple wavelengths, a variable compensator element is used. For example, as shown, a tiltable linear birefringent (retardation) plate 5 is used in one embodiment. Tilting the retarder 5 about an axis perpendicular to the light path changes the elliptic cross section traversed by the incident light and thereby the effective birefringence of the retarder. Thus, the tiltable retarder can operate as a perfect quarter wave retarder at multiple frequencies by tilting the retarder to calibrated angles (as will be discussed in more detail below). Another useful variable compensator is a Babinet Soleil compensator, which can be continuously adjusted to act as a λ/4 wave plate across multiple wavelengths, for example, between 250 nm and 3500 nm.

After interaction with the retarder 5, the incident circularly polarized light impinges on the sample 6. A microscope objective 7 (e.g., mounted on a Prior Scientific MP3500KT polarizing microscope) focuses the light using a projector lens 8 or other similar optical components (e.g., a C-mount from Prior Scientific, Cat #150-W3006) onto a CCD camera 10 (e.g., COHU, Inc Cat #4915-2010). Additional parasitic polarizations of the optical components may be cancelled out by using an optional depolarizer 9, such as a thin slightly tilted glass plate. The inclination and azimuth of the glass plate orientation is used to counterbalance parasitic polarizations. CCD camera 10 includes a CCD detector array as is well known. An image of the sample is detected or captured by the CCD detector array and stored to a memory module. Other useful detector elements include a MOSFET camera.

In one aspect, the microscope system is controlled by a control system (not shown). For example, the control system may include a PC with Microsoft Windows 2000, NT, XP or other similar operating system (OS) installed, extended by two additional drivers to connect to the parallel printer port of the computer and a video Card (e.g., Osprey video card), connected to the CCD camera (e.g., 'TVicHW32 5.0', Osprey driver software). The control system, in one aspect, automatically controls operation of stepper motors for controlling movement of components of microscope 20, for example by executing software stored in system memory or on disk. The software may be implemented using any convenient programming language such as C, C+, Visual Basic, Fortran, Cobol, Machine language, Borland-Delphi, (e.g., Delphi 6 or 8), and others as will be apparent to one skilled in the art. Control system software routines as are taught herein may be provided on a computer readable medium, such as a portable medium (e.g., CD, DVD, floppy disk) or hard disk medium, or transmitted or downloaded to the control system over a network as is well known.

In one aspect, the control system is configured (e.g., in software) to operate the microscope as described below with reference to FIG. 3, which shows a process flow 100 for obtaining a CD image of a sample according to one embodiment. In step 105, memory is cleared. In step 110, the wavelength is selected, e.g., by translating the color filter 2 using a computer driven horizontal translation stage driven by a stepper motor. When a V-diaphragm is used, the slit size, and therefore also the line width of monochromatic illumination, may be selected manually or automatically through shifting the V-diaphragm perpendicular to the linear filter. In step 115, the computer drives another stepper motor to tilt the birefringent plate to a calibrated angle to make it a perfect quarter wave retarder at the selected wavelength. The rotatable polarizer is then driven to +x° and −y° with respect to the extinction directions of the tunable λ/4 plate in steps 120 and 140, respectively. In one aspect, the values of x and y vary slightly from the ideal +45° because of a calibration designed to compensate for reflection effects.

In steps 130 and 150, an image is captured by the CCD detector array. These images are stored in steps 135 an 155, for example as bitmap image files. Once a bitmap image of the light emerging from the circularly dichroic sample is stored in memory for polarizer position x in step 135, the microscope rotates the linear polarizer by about 90° to angle y in step 140 so as to send perfect CPL of the opposite handedness through the sample. The image of the sample is then captured 150 and stored 155, e.g., as a bitmap image in memory as well. The difference of the two images is then determined in steps 160 to 175. In one aspect, the difference is normalized by the regular absorption of the sample calculated from the average intensities per pixel of the two images. This yields the CE per pixel in terms of ΔI/I$_0$.

In one aspect, several images are integrated before calculating the difference image. For example, image capture may be repeated multiple times for each polarization angle x (step 125) and y (step 145) as dictated by a configurable control setting (maxframe). The difference measurement can be repeated multiple times (e.g., up to hundred times or more) to reduce the noise level. In one aspect, a background image obtained from a measurement without sample is subtracted from the final image to enhance the image quality. In one aspect, after storing images for one wavelength, the process is repeated for another wavelength. For example, the interference filter is advanced to select another wavelength and the λ/4-compensator is adjusted accordingly to obviate its dispersion.

To obtain an improved CE-image of an interesting sample, a portion of a CE image, e.g., a small sample rectangle, may be selected from the CE image and is related to another portion, which must be a region in the CD image without effect (see, for additional details, FIG. 3).

The improved CE of one or multiple sample pixels or of the whole image may be calculated from following algorithm:

$$CE^S = \frac{(p_2^S - kp_1^S)}{I^S}, \quad I^S = \frac{1}{2}(p_1^S + p_2^S), \quad k = \frac{(p_2^R - p_1^R)}{p_1^R} + 1,$$

where the pixel intensities $p_{1/2}^{S/R}$ refer to image 1 and image 2 at the two polarizer angles and the sample (s) and reference (r) pixels, respectively. The effect of this procedure is to scale the second image by a factor k to compensate for light intensity fluctuations of the light bulb. This method may be necessary if it is not possible to simply calculate the difference of two interesting regions in the image when those regions have different amounts of absorption.

The CE-effect in the sample rectangle, i.e., the sum of pixel measurements $CE^S$, normalized to the number of pixels within, is then plotted versus the wavelength. The spectral range of the system described above operates at wavelengths ranging from about 380 nm to 700 nm (visible range). It will be appreciated that a microscope system operating at other wavelength ranges may be constructed according to the teachings herein with appropriate selection of optical and imaging system components for the desired wavelengths, e.g., monochromatic light source, polarizer and compensator elements and CCD array. For example, a microscope system may be configured to operate in the UV region and beyond (e.g., 380 nm to 120 nm or smaller), and in the IR region and beyond (e.g., about 700 nm to about 7.5 μm or larger) with the appropriate selection of optical components as would be apparent to one skilled in the art.

In one aspect, a microscope according to the present invention can be run in different modes, including:

Mode 1: With a tunable quarter wave plate element 5 inserted, and the analyzer of the microscope removed, it measures CE.

Mode 2: When the rotating polarizer is set parallel to the eigenmodes of the quarter wave retarder, absorption spectra can be derived. Here, utilizing the sample-reference method above, the absorbance is obtained from $A = \log(P^R/P^S)$, where $p^R$ and $p^S$ are the intensities of pixels in reference and sample areas. This method is virtually free of light source fluctuations. When taking two wavelengths scans with orthonormal polarizer angles, having the sample aligned with its eigenray directions parallel to those of the quarter wave plate and polarizer, spectra of polarized light absorption micrographs can be obtained.

In one embodiment, a microscope according to the present invention is calibrated with respect to the signal, the wavelength and the quality of CPL as follows.

Calibration of the polarizer and tunable quarter wave compensator: A linear polarizer is inserted aligned with the quarter wave plate that was aligned to the tilting shaft of its mount. When recording a CE image, no signal is obtained when the polarizer is ideally at 45° relative to the retarder extinction direction. As there is reflection involved, the actual position of the polarizer may deviate from 45°. When turning the sample polarizer at 45° towards the compensator, the tilt angle can be adjusted until no signal is measured. The signal varies linearly over the angular changes applied to polarizer and compensator positions. The zero crossing of the signal is observed and used to automatically calibrate the optical components.

Wavelength: A spectrometer, such as an Ocean Optics spectrometer, is inserted into the light path to measure the light profile and calibrate the linear interference filter settings.

The CE signal depends on the dark-image of the CCD camera. The intensity settings for the camera are varied to have zero-dark images. In addition, a pixel grid, e.g., a 10×10 pixel grid, over the CCD-image is established to determine the overall light load of the camera. The integrated intensities of the grid correlate with the dark current (blooming). After calibrating the dark current to this light load values, the intensities are corrected for blooming from the integrated grid intensities.

All calibration values are preferably stored to memory for use by the control system.

In one aspect, the use of the microscope can be extended by adding a second rotating polarizer after the sample. When rotating this polarizer stepwise for CPL entering the sample, the intensity images are used to calculate the birefringence ($|\sin\delta|$), eigenray direction and overall absorption.

Also, it should be apparent to one skilled in the art that the techniques of the present invention should not be restricted to microscopy, but rather can be applied to any optical train that starts with a light source. For example, a telescopic system configured to measure circular components (e.g., circular polarization components) in light from a remote source (e.g., from an astronomical object) can be constructed by reversing the light source and camera in a system as described herein.

Applications, Theory and Experimental Results

As above, a microscope system according to the present invention can be configured to operate in different modes, including:
1. CE/CD imaging.
2. CE Spectrometry of µm size samples
3. LD Spectrometry CE Imaging CE can result from CD, optical rotation scattering (ORS), or lamellar twinning of dichroic samples. FIG. 4a demonstrates a CD image of a partially birefringent crystal plate of dihydroxyanthraquinone (DHA). FIG. 5a shows a CE image of horse-hemoglobin crystals that are lamellar twinned. FIG. 6 shows a CD image of Congo red dye inclusions in amyloid fibrils. FIG. 7 shows a CE image as a result of ORS of Chicago sky blue in LiKSO$_4$. In all four cases, the CD imaging technique of the present invention reveals twinning patterns. Investigations of this kind are of special interest for solid-state scientist and biologists. ORS signals are specific for the absolute orientation of dipoles of dyed samples that exhibit birefringence.

Colored pharmaceuticals may be characterized with respect to polymorphism and structural enantiomorphs employing the CE-microscope. Applications in this area will become manifold, especially using instruments designed to operate in the UV and IR regions of the electromagnetic spectrum.

CE Spectrometry

FIG. 4b gives the CD spectrum of DHA. The spectrum was obtained in calculating the CE-signal of enantiomorphic sections. FIG. 5b demonstrates different CE spectra in hemoglobin crystal sections.

LD Spectrometry

This option requires sample alignment with the polarizer set parallel to the eigen modes of the quarter wave plate. Absorbance spectra are collected for the two eigen modes of the sample, showing the linear dichroism.

Circular Extinction Imaging Microscope

Theory

The Jones matrix for a birefringent and circularly dichroic sample (neglecting linear absorption) is, $$j_{\delta,\eta} = \begin{bmatrix} e^{ix} & i\eta\frac{\sin x}{x} \\ -i\eta\frac{\sin x}{x} & e^{-ix} \end{bmatrix}$$

where $x=\delta/2$, $\delta=2\pi\Delta nL/\lambda$, the phase shift of the extraordinary and ordinary rays at the interface of the sample, and $\Delta n$ is the linear birefringence (LB). (See, Schellman, J.; Jensen, H. P. *Chem. Rev,* 1987, 87, 1359–1399 and Disch, R. L; Sverdlik, D. I. *Anal. Chem.* 1969, 41, 82–86). The CD is defined as $\eta=4(I_+-I_-)/I_o\equiv\eta'$, where $I_+$ and $I_-$ are right and left CPL, respectively. The complex vectors A represent these light forms, where $E_0$ is the amplitude of the incoming light wave:

$$A = \frac{1}{\sqrt{2}}\begin{bmatrix} 1 \\ \pm i \end{bmatrix}E_0$$

The intensity $I'_\pm$ is found from $A_\pm'^* \cdot A_\pm'$, where $A_\pm' = j_{\delta,\eta} \cdot A_\pm$. The total intensity is then $$\frac{I'_\pm}{E_0^2} = 1 \pm 2\eta\frac{\sin x\cos x}{x} + \eta^2\frac{\sin^2 x}{x^2}$$

The normalized intensity difference in a birefringent sample then is found as $$\frac{I'_+ - I'_-}{I_0} = 4\eta \frac{\sin x \cos x}{x} = \eta' \frac{\sin \delta}{\delta}$$

This expression describes the observed CD in a birefringent sample provided that there is no parasitic linearly polarized contribution to the incoming CPL.

Experimental Systems and Results

A depolarizer, sliding interference filter, variable slit, Glan Thompson polarizer fixed to a gear driven by a stepper motor, and rotating λ/4 plate were mounted beneath the sample stage of a microscope (see, e.g., FIG. 1). To obtain CE measurements on oriented samples the polarizer is alternately driven to +45° and −45° with respect to the extinction directions of a λ/4 retarder that is tuned by tilting about an axis perpendicular to the light path to compensate for dispersion. Tilting the retarder changes the pathlength and the elliptic cross-section traversed by the incident light and thereby the effective birefringence of the retarder. This helps ensure the integrity of alternating right and left CPL produced at all wavelengths selected by the variable interference filter. The difference of the two images, normalized by the regular absorption of the sample, yields the uncorrected CE per pixel in terms of $(I_{45°} - I_{-45°})I_o$. After storing the integrated data, the interference filter is advanced to another wavelength and the λ/4-compensator is adjusted accordingly. To obtain a CE spectrum of a heterogeneous sample, a region as small as a few pixels of a 640×480-pixel image is compared to a reference area showing no CE. The difference between the sample and reference regions, each normalized to the number of pixels, is then plotted versus the wavelength between 370 and 710 nm. Such comparisons, independent of light fluctuations, increase accuracy. Many images were integrated before calculating the difference to reduce the noise level. A background image obtained from a measurement without the sample is subtracted from the final image. In this way, the Cotton effects associated with crystalline $NiSO_4 \cdot 6H_2O$ along the optic axis were reproduced. (See, Harada, T.; Shindo, Y.; Kuroda, R. *Chem. Phys. Lett.* 2002, 360, 217–222).

An additional linear polarizer was used as a sample to calibrate the tunable λ/4 plate. When recording a CE image, no signal will be obtained when the sample polarizer is ideally aligned between the eigenrays of a λ/4 retarder that is optimized for that wavelength. As the wavelength was varied with the interference filter, the tilt angle was adjusted until no signal was measured. The signal varied smoothly over the angular changes applied to polarizer and compensator positions. The zero crossing of the signal was used to automatically calibrate the optical components.

All polarizing and refracting components of a Prior Scientific microscope (200-MP3500KT) were removed before coupling with a C-mount to a COHU CCD camera (4910 Series). The microscope was equipped with a monochrometer system including a linear interference filter (Reynard Corporation, Model R04610-00), which in combination with a variable slit limits the spectral line width down to about 5 nm in the range of about 360–710 nm. The λ/4 retarder is a low order birefringent plate. A video card that supports Video For Windows format read the output of the camera. The driver for the microscope was written in Delphi. Additional software packages used were 'TVicHW32 5.0' (see, Victor Ishikeeve: 2001, http://www.enytechtaiwan.com/tools.htm) to address the parallel printer port, and the commercial drivers for an Osprey video card. (See, View Cast Corporation: http://www/mmac.com/). The motors were driven via custom electronics through the parallel printer port of the PC.

Linear Anisotropies

Linear anisotropies were analyzed with a prototype of the MetriPol System now available from Oxford Cryosystems. (See, http://www.metripol.com/). By modulating the intensity signal as a function of the polarizer angle α, $I/I_o(\alpha)$ for each pixel is subject to a Fourier separation of the disparate optical contributions that are displayed in false color images representing the overall transmission, the phase factor δ and the directions of the eigenrays, also called extinction. (See, Glazer, A. M.; Lewis, J. G.; Kaminsky, W. *Proc. Roy. Soc. London, A*, 1996, 452, 2751–2765). The expressions for transmitted intensity follows:

$$\frac{I}{I_o} = \frac{1}{2}[1 + \sin^2(\alpha - \varphi)\sin\delta]$$

where φ is the orientation of the slow vibration direction as measured counterclockwise from the horizontal axis.

To implement the MetriPol method, another Prior Scientific microscope (200-MP3500KT) was adapted with a stepper motor driven rotating polarizer, circular analyzer consisting of a linear analyzer and quarter wave plate aligned at 45°, and an 8-bit monochrome CCD digital camera. The 610 nm illumination was accessed with an interference filter. The measurements were calibrated for a linear camera response, quarter wave plate alignment, and polarization bias of the light source, camera, and objective. Image resolution is ~0.1% of the transmission, 0.05 nm of the retardation LΔn, and ~0.1 0 of the orientation.

Crystal Structure

To demonstrate the viability of CE and CD microscopy, a sample of crystalline 1,8-dihydroxyanthraquinone (DHA, see FIG. 8) was studied. Large (0.5 cm×0.5 cm×100 μm), square, orange plates were formed by evaporation of 50:50 (v:v) acetone/acetonitrile solutions. The crystals were often raised in the center and along the borders between lateral growth sectors as seen in the optical density in FIG. 9a, but were nevertheless well suited to optical experiments.

The crystal structure of DHA was determined previously. (See, Jagannadham, A. V.; *Z. Krist.* 1957, 108, 457–458; Prakash, A. *Z. Krist.* 1965, 122, 272–282). The molecules crystallize in the enantiomorphous space groups $P4_{1(3)}$.

As such, they must occupy general positions in the lattice but nevertheless have near $C_{2v}$ symmetry by virtue of the fact that the hydroxyl hydrogen atoms are intramolecularly bound to the oxygen at position 9, thus creating a rigid, flat, pentacyclic structure. Four molecules in the unit cell spiraling along [001] are pictured in FIG. 10A. The molecules form lamellae with close packing between aromatic molecules of ~3.5 Å. The strongest interactions between molecules appear to be of the dipole-dipole type, with polar chains of carbonyl oxygen atoms making $O_9 \ldots O_{10}$ contacts between molecules of 2.776(8) Å (FIG. 10B). A gas-phase dipole moment of 0.98 D, pointing in the direction of the tri-oxygen side of the molecular polar axis, was calculated using Spartan (see, *PC Spartan Pro, Version* 1.0.3, Wavefunction Inc. Irvine Calif., 2000) at the HF 6-31 G* level of theory. Nevertheless, the interactions between molecules are not strongly determined.

Anomalous Linear Birefringence

DHA was studied in the context of a review of so-called "optically anomalous crystals." (See, Kahr, B.; McBride, J. M. *Angew. Chem. Int. Ed. Engl.* 1992, 31, 1–26). Despite the clearly tetragonal morphology and X-ray crystal structure, the crystals seemed to show pronounced LB when viewed along [001]—the direction that should be the optic axis (See, The curious observation was first reported by: A. Neuhaus, *Z. Kristallogr.* 1943, 105, 195)—and complex extinction patterns.

Extensive studies were aimed to determine the origin of the optical desymmetrization. Many optically anomalous molecular crystals owe their peculiar physical properties to the presence of impurities or disordered molecules that are distributed non-statistically and thus break the symmetry. (See, Vaida, M.; Shimon, L. J. W.; Weisinger-Lewin, Y.; Frolow, F.; Lahav, M.; Leiserowitz, L.; McMullan, R. K. *Science (Washington, D.C.)* 1988, 241, 1475–1479). No such impurities or minor orientations could be found in difference Fourier maps. The possibility that an invisible impurity might be a tautomer was considered, (see, Smulevich, G.; Marzocchi, M. P. *Stud. Biophys.* 1984, 104, 105–110; *Chem.*

*Phys.* 1985, 94, 99–108; ibid. 1986, 105, 159–171) but could not be found by solid state $^{1}$H— or $^{13}$C-NMR nor equilibrate the crystals thermally or photochemically to thereby obtain optical homogeneity.

Since CD varies as $(\sin\delta)/\delta$, the phase factor $\delta$ must be quantified in order to derive the absolute CD. This was done using the rotating polarizer technique above. The crystals had a variable $|\sin\delta|$, showing the largest birefringence at growth sector boundaries (FIG. 9c).

Curiously, in the center of the crystal, two distinct pinwheels were in evidence having values of $\sin(\delta)$ that alternated between regions with maximum values of 0.25 to about 0.60 (FIG. 9c). The crystals showed great variance in their eigenray directions (described by the extinction angle $\phi$ in FIG. 9d). While the optical indicatrices of the (100) and (010) sectors were clearly related to one another by 90° rotations around [001], there were marked deviations from orthogonality especially in the center of the crystals. However, images produced between crossed polarizers or with the rotating polarizer method (see, Glazer, A. M.; Lewis, J. G.; Kaminsky, W. *Proc. Roy. Soc. London, A,* 1996, 452, 2751–2765), could reflect ellipticity changes that result from CD (See below) as well as LB.

Circular Dichroism Microscopy

Stress resulting from twinning could in principal account for the anomalous birefringence, but any such twinning in Laue patterns could not be detected. Only pernicious enantiomorphous twinning could so go unnoticed. Therefore the crystals were examined using the CDIM of the present invention.

The crystals absorbed light at 490 nm (see, Crystal absorption spectra were obtained with SpectraCode Multipoint Absorbance Imaging (MAI-20) Microscope) (FIG. 11) as compared to 426 nm ($1.2 \times 10^4$ L mol$^{-1}$ cm$^{-1}$) in acetonitrile solution. The crystal spectrum also showed a low energy shoulder at ~530 nm that was not present in the solution spectrum. The LD was vanishingly small for light incident on the plate face.

No contrast was seen in the CDIM at 490 nm. On the other hand, micrographs recorded at 515 nm dramatically show mirror image domains as red (CD is positive) and blue (CD is negative) heterochiral pinwheels (FIG. 9e and f). Blue pinwheels always point counterclockwise and red pinwheels always point clockwise indicating that the crystals tended to grow predominantly along one direction of the polar [001] axis. These images are independent of sample rotation. This is the surest way to rule out linear biases in the optical train. As seen in spectra in FIG. 11, the CD is only associated with the low energy shoulder of the absorption band.

An obvious twinning mechanism involves an orientational disorder in which a molecule flipped about its long anthraquinone axis converts a right-handed helix into a left-handed helix. Polarity argues against disorder but the hydroxyl groups are insulated through intramolecular H-bonds, and therefore they have an unexpectedly small role in determining the crystal packing.

The twin law pictured in FIGS. 9e and 9f that leads to pinwheels is only one of several enantiomorphous twins laws in DHA. Other twin planes include (100), (001) as well as (110) without pinwheels. The (100) and (110) twin planes are seen more clearly in FIG. 12. Region c is related to the nucleation of a crystal layer that would possibly lead to pinwheels seen in thicker samples. The superposition of opposing CD colors indicates the twinning on (001).

Lamellar twinning across (001) is most evident when a crystal is examined through the reverse side. The same precise pattern was not seen when the wave vector was reversed. The Jones formalism for complex optical properties is consistent with this behavior, as the matrices for each layer do not commute.

Enantiomorphous Twinning

Enantiomorphous twinning in molecular crystals is rarely observed. The first example know to us comes from Goldschmidt, in 1915, who carefully examined optically active and optical inactive crystals of β-phenylglycergic acid (see, Goldschmidt, V. M. *Zeit. Krist.* 1915, 55, 123. See also: Furberg, S.; Hassel, O. *Acta Chem. Scand.* 1950, 4, 1020–1023) and recognized that the inactive crystals were not truly racemic but consisted of microscopic lamellae of d and l crystallites. Green and Knossow (see, Green, B. S.; Knossow, M. *Science,* 1981, 214, 795–797. See also: Martin, R. H.; Marchant, M. J. *Tetrahedron,* 1974, 30, 343–345) observed that hexahelicene single crystals grown from racemic solutions, despite being well refined in the chiral space group $P2_12_12_1$, had upon dissolution vanishingly small optical rotations even though resolved hexahelicene has an enormous specific rotation. (See, Newman, M. S.; Lednicer, D. *J. Am. Chem. Soc.* 1956, 78, 4765–4770). The authors determined on the basis the chiroptical behavior of solutions, and the lamellar texture of the crystals, that the enantiomorphous crystalline layers were interleaved. Enantiomorphic twinnings due to oscillatory crystallizations were also reported for racemic 1-(4-chlorophenyl)-4,4-dimethyl-2-(1H-1,2,4-triazol-1-yl)-pentan-3-one, (see, Davey, R. J.; Black, S. N.; Williams, L. J.; McEwan, D.; Sadler, D. E. *J. Cryst. Growth,* 1990, 102, 97–102) racemic 2-azabicyclo [2.2.1]hept-5-en-3-one, (see, Potter, G. A.; Garcia, C.; McCague, R.; Adger, B.; Collet, A. *Angew. Chem. Int. Ed. Engl.* 1996, 35, 1666–1668) and racemic 5-ethyl-5-methylhydantoin. (See, Gervais, C.; Beilles, S.; Cardinaël, P.; Petit, S.; Coquerel, G. *J. Phys. Chem. B,* 2002, 106, 646–652). The authors relied on periodic changes in the optical rotation of the crystallizing solutions and on the lamellar texture of partially dissolved crystals in making these determinations. Because enantiomorphous twins often can not be distinguished in X-ray scattering experiments, a direct, chiroptical, solid state assay of chiral domains was not presented in any of these cases and their existence is known only because the investigators were especially astute in recognizing that their crystals were other than ordinary. It must be that mirror image twinning is common but most often goes unrecognized as evidenced by the recent report that common racemic amino acids often form epitaxial lamellae of enantiomorphs. (See, Berfeld, M.; Zbaida, D.; Leiserowitz, L.; Lahav, M. *Adv. Mater.* 1999, 11, 328–331).

Anomalous Birefringence

It has been well established that strain can lead to anomalous birefringence in crystals (see, Nabarro, F. R. N. *Theory of Crystal Dislocations,* Dover, New York, 1987; Crundwell, G.; Gopalan, P.; Bakulin, A.; Peterson, M. L.; Kahr, B. *Acta Crystallogr. Sect. B.,* 1997, 53, 189–202) and that twinning can lead to strain at grain boundaries. Thus, the anomalous birefringence of DHA may be ascribed to enantiomorphous twinning induced strain. The distinct retardation at the (110) boundaries in FIG. 9c is not seen in the CD image. Since the retardation is largest at the (110) boundaries and decays smoothly with distance, it most likely is caused by strain at the boundaries. However, the apparent changes in birefringence seen in crossed polarized light, especially in the crystal centers dominated by pinwheels, is mostly circular dichroism of DHA which increases the ellipticity of the transmitted light. This judgement comes from an analysis of FIGS. 9c and 9e, in which the red pinwheel (9e) shows the strongest CD and the largest sin($\delta$) (9c). Between the "red arms" the CD signal is of opposite sign but much diminished as is sin($\delta$). Not all of the anomalous birefringence is anomalous birefringence after all.

In a grand overview of optically anomalous crystals, Brauns proposed that optical symmetry reduction could, in some crystals other than DHA, be a consequence of enantiomorphous twinning. (See, Brauns, R. *Die Optischen Anomalien der Krystalle,* S. Hirzel, Leipzig, 1891). Until now, no evidence has been provided to support this classification.

Absolute Configuration

Can the absolution configuration of the enantiomorphous domains be assigned as P4$_1$ or P4$_3$ directly from the CD images? Given the fact that DHA has spirals of intramolecular electric dipole transition moments in planes perpendicular to c, one might expect that the exciton chirality model would be well suited to distinguishing between P4$_1$ and P4$_3$. (See, Harada, N.; Nakanishi, K. *Circular Dichroic Spectroscopy: Exciton Coupling in Organic Stereochemistry,* University Science Books, Mill Valley, Calif., 1983). However, this model implies a bi-signate line shape which is only very weakly observed in DHA. An alternative approach based on charge transfer to explain the CD signal is discussed after the coupled oscillator model.

The DHA molecules in the crystal have approximate mm2 ($C_{2v}$) symmetry. Even were this the site symmetry in the crystals, mm2 is an optically active point group (See, O'Loane, J. K. *Chem. Rev.* 1980, 80, 41–61) and individual layers could well show CD. However, an individual layer can not contribute to the CD through the coupled dipole mechanism because the strong $\pi \rightarrow \pi^*$ transition moments are all parallel. (See, Madsen, H.; Terpager, I.; Olskaer, K.; Spanget-Larsen, *J. Chem. Phys.* 1992, 165, 351–360). The CD most likely arises from interactions of molecules between layers following the 4$_{1(3)}$ axis. This interpretation is consistent with the fact that the CD signal is only associated with the shoulder in the absorption band. However, crossed dipoles typically give a bi-signate CD spectrum. If the exciton model is appropriate in this case, the high-energy component of the excited state split by the Davydov interaction appears to be electric dipole disallowed. In the context of this interpretation, we can conclude that the P4$_1$ structure pictured in FIG. 10A should give rise to a positive Cotton effect at low energy (red curve in FIG. 11).

The exciton chirality method has been developed into a powerful tool for the assignment of the absolute configuration of suitably derivatized molecules in solution. This was a welcome advance because previously, the only way to determine the absolute configuration of compounds was through the interpretation of the anomalous dispersion of X-rays, a technique notoriously unreliable for light atom organic compounds of C, H, and O, such as DHA. However, the use of the exciton chirality method to assign the absolute configuration of a crystal is rare. Only one known example comes from Aoyama and coworkers who compared the averaged CD spectra of powders of homochiral Cd(NO$_3$)$_2$ coordination polymers of 5-(9-anthracenyl)pyrimidine (see, Ezuhara, T.; Endo, K.; Aoyama, Y. *J. Am. Chem. Soc.* 1999, 121, 3279–3283) with the absolute configuration determined by X-ray diffraction, which was attempted, but found inconclusive lacking a strong anomalous X-ray scattering element in DHA. Now, with the ability to measure the circular dichroism spectrum of single crystals of low symmetry directly, it is possible to apply the exciton chirality method with some generality, especially since the geometries of the molecules in the crystal are well defined. Conformational complexity is probably the most common reason for failure of the exciton chirality method for suitably derivatized molecules in solution. (see, Lightner, D. A.; Gurst, J. E. *Organic Conformational Analysis and Stereochemistry from Circular Dichroism Spectroscopy,* Wiley-VCH, New York, 2000). In crystals, it is known precisely where to find the coupled oscillators.

The exciton chirality model has in the past been so compelling that researchers have used it to challenge the very foundation of the Bijvoet method. (See, Tanaka, J.; Katayama, C. *J. Chem. Soc. Chem. Commun.* 1973, 21–22; Tanaka, J.; Ozeki-Minakata, K.; Ogura, F.; Nakagawa, M. *Spectrochimica Acta,* 1973, 29A, 897–924). However, in circumstances where the questions remain about the electronic structure of the system under investigation, past experience argues for caution. Careful consideration of the positions of the dipoles in the puzzling ethanoanthracenes and triptycenes, whose configurations determined by exciton interactions were at variance with results obtained by anomalous dispersion, dispelled the confusion. (See, Mason, S. F. *J. C. S. Chem. Commun.* 1973, 239–241; Hezemans, A. M. F.; Groenewege, M. P. *Tetrahedron,* 1973, 29, 1223–1226). The application of the exciton chirality model in DHA is complicated by the fact that the excitations are undoubtedly delocalized over more than two sites.

An alternative interpretation of the CD spectrum in DHA relies on the assignment of the low-energy absorption as a charge transfer band between molecules in adjacent layers. In this way, there is a natural circulation of charge producing a rotary strength by the coupling of electric and magnetic dipoles. This interpretation obviates an explanation of the absence of the bi-signate line shape as only a single Cotton effect would be expected. Given a helical circulation of charge in the spiral of DHA molecules shown in the P4$_1$ structure in FIG. 10A we would expect parallel electric and magnetic moments and therefore a positive Cotton effect in agreement with the exciton model. (See, Eliel, E. L.; Wilen, S. H. *Stereochemistry of Organic Compounds*, Wiley, New York, 1994; Chapter 13). Resonance Raman studies of the absorption shoulder are currently underway in order to more fully assign the transition and thus interpret the origin of the CD spectrum.

CONCLUSION

The CE contrast imaging techniques of the present invention are useful for studying a wide range of anisotropic substances encountered in materials science and crystallography, as well as cell biology and pathology where dyed, chiral anisotropic structures are ubiquitous.

All articles cited or discussed herein are hereby incorporated by reference.

While the invention has been described by way of example and in terms of the specific embodiments, it is to be understood that the invention is not limited to the disclosed embodiments. To the contrary, it is intended to cover various modifications and similar arrangements, in addition to those discussed above, as would be apparent to those skilled in the art. Therefore, the scope of the appended claims should be accorded the broadest interpretation so as to encompass all such modifications and similar arrangements.

What is claimed is:

1. A system for producing a circular extinction (CE) contrast image of a sample, the system comprising:
    an optical system configured to selectively produce near perfect right and left circularly polarized illumination light at each of one or more specific, selectable wavelengths; and
    an imaging system, including a CCD detector for detecting an image of a sample positioned in the path of the illumination light between the CCD detector and the optical system,
    wherein a first image of the sample is taken by the CCD detector when the illumination light is right circularly polarized at a selected wavelength, and wherein a second image of the sample is taken by the CCD detector when the illumination light is left circularly polarized at the selected wavelength, and wherein a CE contrast image of the sample is produced in the imaging system by taking the difference of the first and second images.

2. The system of claim 1, wherein the optical system includes a visible light source, a variable spectral filter, and a variable slit for controlling the line width, wherein selectable adjustment of the position of the filter and the variable slit in the illumination light path produces illumination light having a substantially monochromatic wavelength.

3. The system of claim 1, wherein the optical system includes a rotatable linear polarizer element that linearly polarizes the illumination light along a direction determined by an angle of rotation of the polarizer.

4. The system of claim 3, wherein the optical system includes a variable retardation element configured to produce circularly polarized light from linearly polarized light.

5. The system of claim 4, wherein the optical system includes an adjustable $\lambda/4$ retarder element having a wavelength dependent extinction direction as determined by a tilt angle about an axis perpendicular to the light path.

6. The system of claim 5, wherein the tilt angle of the retarder element is adjusted such that the extinction angle for the selected wavelength gis set, and wherein the rotatable linear polarizer is controlled to rotate such that the angle of polarization is about 45° with respect to the extinction direction of the retarder element so that the illumination light is circularly polarized of one handedness, and wherein the linear polarizer is then controlled to rotate by 90° so that the illumination light is circularly polarized of the opposite handedness.

7. The system of claim 3, wherein the optical system includes a Babinet Soleil compensator.

8. The system of claim 1, wherein the one or more specific, selectable wavelengths are within a range of about 380 nm to about 700 nm.

9. The system of claim 1, wherein the one or more specific, selectable wavelengths are between about 120 nm and about 7.5 $\mu$m.

10. The system of claim 1, wherein the optical system includes:
    a visible light source;
    a variable spectral filter, wherein selectable adjustment of the position of the filter in the illumination light path produces a substantially monochromatic wavelength;
    a rotatable linear polarizer element that linearly polarizes the illumination light along a direction determined by an angle of rotation of the polarizer; and
    a variable retardation element configured to produce circularly polarized light from linearly polarized light.

11. The system of claim 10, wherein the variable retardation element includes one of a Babinet Soleil compensator element and a linear birefringent plate having a wavelength dependent extinction direction as determined by a tilt angle about an axis perpendicular to the light path.

12. The system of claim 10, wherein the optical system further includes a depolarizer element positioned between the filter and the linear polarizer element.

13. The system of claim 1, wherein the imaging system includes an objective lens for focusing images from the sample onto a pixel array of the CCD detector.

14. The system of claim 1, further including a control system for automatically controlling operation of the optical system and the imaging system.

15. The system of claim 14, wherein the control system includes a computer system and one or more stepper motors coupled to one or more optical components, wherein each stepper motor is configured to be automatically controlled by the computer system to adjust a position or an orientation of an optical component.

16. The system of claim 1, wherein multiple first and second images are captured at the selected wavelength, and wherein the multiple images are integrated to produce the CE contrast image.

17. The system of claim 1, wherein multiple first and second images are captured at each of multiple selected wavelengths, and wherein multiple CE contrast images are produced therefrom.

18. A method of producing a circular extinction (CE) contrast image of a sample; the method comprising:
    illuminating a sample with near perfect right circularly polarized light having a substantially monochromatic wavelength;
    capturing, using a CCD detector, a first image of the sample illuminated with the right circularly polarized light;
    illuminating the sample with near perfect left circularly polarized light having said substantially monochromatic wavelength;
    capturing, using the CCD detector, a second image of the sample illuminated by the left circularly polarized light; and generating a CE contrast image of the sample using the first and second images.

19. The method of claim 18, wherein generating a CE contrast image includes producing a difference image using the first and second images.

20. The method of claim 18, wherein illuminating includes:
linearly polarizing illumination light having a substantially monochromatic wavelength with a rotatable polarizer element such that the plane of polarization is perpendicular to an axis of transmission of the illumination light; and
converting the linearly polarized illumination light to circularly polarized light using a variable retardation element.

21. The method of claim 20, wherein the retardation element has a wavelength dependent extinction direction as determined by a tilt angle about an axis perpendicular to the axis of transmission of the illumination light, the method further including adjusting the tilt angle so that the extinction direction is set for the substantially monochromatic wavelength.

22. The method of claim 21, further including:
rotating the polarizer element so that the angle of polarization is about 45° relative to the set extinction angle of the retardation element to obtain one of left or right circularly polarized light, and thereafter
to obtain circularly polarized light of the opposite handedness, rotating the polarizer by about 90°.

23. The method of claim 22, further including determining and storing valuews of the extinction angle of the retardation element for each of a plurality of wavelengths.

24. The method of claim 20, wherein illuminating includes illuminating an adjustable color filter with a light source and adjusting the position of the filter to obtain one of a plurality of specific monochromatic wavelengths.

25. The method of claim 18, wherein capturing first and second images is repeated multiple times at each circular polarization state, and wherein generating a circular extinction contrast image includes integrating over the multiple images.

26. The method of claim 18, wherein illuminating includes providing a white light source, adjusting the position of a variable density filter in a light path to select a desired region, and adjusting a v-shaped element to control the spectral line width of the light in the light path such that the illumination has a substantially monochromatic wavelength.

27. The method of claim 18, further including:
selecting a reference portion of an image that has no circular extinction (CE); and
comparing a second portion of the image to the reference portion so as to produce a CE spectrum.

28. The method of claim 27, wherein all steps are repeated for each of multiple different wavelengths.

29. A circular extinction (CE) contrast imaging microscope, comprising:
a monochromatic light source configured to provide substantially monochromatic illumination light at each of one or more selectable wavelengths;
a depolarizer for depolarizing the illumination light;
a polarization element for linearly polarizing the depolarized illumination light along a direction determined by an angle of rotation of the polarizer;
a variable retardation element configured to convert the polarized illumination light to near perfect circularly polarized light at each of the one or more selectable wavelengths, the handedness of circular polarization being determined by the direction of linear polarization relative to an orientation of the retardation element;
a sample stage for holding a sample, said sample stage being illuminated by the circularly polarized illumination light;
an imaging system, including a CCD detector for detecting an image of a sample in the sample holding stage; and
a control system, including stepper motors coupled to each of the linear polarizer and the variable retardation element, for automatically controlling the direction of the linear polarization and the orientation of the retardation element so as to control the handedness of the circular polarized illumination light;
wherein a first image of the sample is taken by the CCD detector when the illumination light is right circularly polarized at a selected wavelength, and wherein a second image of the sample is taken by the CCD detector when the illumination light is left circularly polarized at the selected wavelength, and wherein a CE contrast image of the sample is produced in the imaging system by taking the difference of the first and second images.

30. The microscope of claim 29, wherein the illumination light source includes:
a visible light source;
a variable spectral filter; and
a variable slit for controlling a line width of monochromatic light, wherein the control system automatically adjusts the position of the filter and the variable slit in the illumination light path so as to produce the illumination light having a substantially monochromatic wavelength.

31. The microscope of claim 29, wherein the variable retardation element includes one of a Babinet Soleil compensator and a linear birefringent plate having a wavelength dependent extinction direction as determined by a tilt angle about an axis perpendicular to the light path.

32. The microscope of claim 29, wherein the variable retardation element includes an adjustable birefringent plate having a wavelength dependent extinction direction as determined by a tilt angle about an axis perpendicular to the illumination light path, wherein the tilt angle of the plate is adjusted such that the extinction angle for the selected wavelength is set, and wherein the linear polarizer is controlled to rotate such that the angle of polarization is about 45° with respect to the extinction direction of the tilted plate so that the illumination light is circularly polarized of one handedness, and wherein the linear polarizer is then controlled to rotate by 90° so that the illumination light is circularly polarized of the opposite handedness.

33. The microscope of claim 29, wherein the one or more specific, selectable wavelengths are within a range of about 380 nm to about 700 nm.

34. The microscope of claim 29, wherein the one or more specific, selectable wavelengths are between about 120 nm and about 7.5 µm.

* * * * *

UNITED STATES PATENT AND TRADEMARK OFFICE
CERTIFICATE OF CORRECTION

PATENT NO. : 7,292,389 B2
APPLICATION NO. : 10/968834
DATED : November 6, 2007
INVENTOR(S) : Werner Kaminsky and Bart Kahr It is certified that error appears in the above-identified patent and that said Letters Patent is hereby corrected as shown below:

Column 1, lines 16-19:

replace "The government may have certain rights to the invention based on NSF Grant No. CHE-0092617, "Optical Probes of Crystal Growth Mechanisms", and NSF Grant No. CHE-0092817." with --This invention was made with U.S. Government support under grant numbers CHE-0092617 and CHE-0092817 awarded by the National Science Foundation. The U.S. Government has certain rights in the invention.--

Signed and Sealed this

Fifteenth Day of April, 2008

JON W. DUDAS
*Director of the United States Patent and Trademark Office*